(12) United States Patent
Coleman et al.

(10) Patent No.: US 6,788,307 B2
(45) Date of Patent: Sep. 7, 2004

(54) SYSTEM AND METHOD FOR IMPROVED PIXEL RENDERING PERFORMANCE

(75) Inventors: Terrence J. Coleman, San Diego, CA (US); Ken George, Bluffdale, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 127 days.

(21) Appl. No.: 10/119,591

(22) Filed: Apr. 9, 2002

(65) Prior Publication Data

US 2003/0189575 A1 Oct. 9, 2003

(51) Int. Cl.[7] ................................................. G09G 5/00
(52) U.S. Cl. ........................ 345/613; 345/614; 382/269
(58) Field of Search .......................... 345/581, 582–618; 382/269

(56) References Cited

U.S. PATENT DOCUMENTS

| | | | | |
|---|---|---|---|---|
| 4,918,626 A | * | 4/1990 | Watkins et al. | 345/421 |
| 5,157,385 A | * | 10/1992 | Nakao et al. | 345/613 |
| 5,684,939 A | | 11/1997 | Foran et al. | 395/131 |
| 5,854,631 A | * | 12/1998 | Akeley et al. | 345/419 |
| 6,072,500 A | | 6/2000 | Foran et al. | 345/431 |
| 6,429,876 B1 | * | 8/2002 | Morein | 345/611 |
| 6,429,877 B1 | * | 8/2002 | Stroyan | 345/611 |

OTHER PUBLICATIONS

Reality Engine Graphics by Kurt Akerley, Silicon Graphics Computer Systems.

* cited by examiner

Primary Examiner—Joseph Mancuso
Assistant Examiner—Alysa Brautigam
(74) Attorney, Agent, or Firm—Thorpe North & Western LLP

(57) ABSTRACT

A device for improving pixel rendering performance in a computer graphics system. The device includes a pixel resolution buffer containing a plurality of pixel storage locations to store pixel values. A depth value is provided for each pixel storage location in the pixel resolution buffer, to store a closest depth for polygons that cover the pixel. A subpixel resolution buffer is also included with a least two subpixels corresponding to each pixel storage location in the pixel resolution buffer.

8 Claims, 4 Drawing Sheets

SYSTEM AND METHOD FOR IMPROVED PIXEL RENDERING PERFORMANCE

FIELD OF THE INVENTION

The present invention relates generally to rendering of pixels in a computer graphics system. More particularly, the present invention relates to faster rendering of pixels in a computer graphics system.

BACKGROUND

Computer graphics images are often drawn on a raster-scan display and have a two dimensional array of pixels. These pixels are used to sample and render a geometric mathematical model, which represents a virtual world created by a computer graphics modeler. This quantization process often creates problems or anomalies in the primitives or polygons that are processed. One problem is that visual artifacts are produced because the viewer's ability to resolve the image often exceeds the resolution of the display. For example, the image may be displayed at 1024×1280, which is a much lower resolution than the maximum resolution that the human eye is able to resolve.

The resulting visual problems are called aliasing, which includes undesirable results such as jagged edges, staircasing, flickering, scintillation and other problems. These aliasing effects are especially noticeable when a primitive object or polygon has a straight line or edge that does not align with the horizontal or vertical arrangement of the pixels. As can be imagined, objects in computer graphic images are not always horizontally or vertically aligned with the pixels. Techniques that reduce or eliminate these undesirable effects are referred to as antialiasing.

One method for reducing aliasing is called supersampling. This approach takes more than one sample for each pixel and combines them together to create the final pixel. Each supersample or subpixel typically includes a color-value (or grey-scale value) and a Z-value. The depth value or Z-value represents the relative depth of a sample in the scene and it is used to perform hidden surface removal.

Antialiasing is generally implemented with subpixel buffers that include 2, 4, 8, or 16 times as many subpixels as the pixel resolution image. Each pixel has a corresponding number of subpixels, such as 16 subpixels for each pixel. These subpixel buffers have often been implemented with dynamic random access memory (DRAM or SDRAM) or other more expensive types of high speed RAM.

In a system implemented with SDRAM or double data-rate (DDR) RAM, the graphics system performance is inversely proportional to the number of subpixels for each pixel. This is because the system performs calculations and memory accesses for each additional subpixel that is used. Thus, performance is decreased by a factor of 2, 4, 8, or 16 or more when supersampling anti-aliasing is employed. Higher speed RAM can be used to increase the performance of the system but this increases the cost of the graphics system.

SUMMARY OF THE INVENTION

The invention provides a device for improving pixel rendering performance in a computer graphics system. The device includes a pixel resolution buffer containing a plurality of pixel storage locations to store pixel values. A depth value is included for each pixel storage location in the pixel resolution buffer, to store a closest depth for polygons that cover the pixel. A subpixel resolution buffer is also included with at least two subpixels corresponding to each pixel storage location in the pixel resolution buffer.

In accordance with a more detailed aspect of the present invention, the system includes a a polygon coverage flag in the pixel resolution buffer for each pixel storage location, where the polygon coverage flag represents whether one or more polygons are associated with the pixel.

One embodiment of the invention includes a method for improving pixel rendering performance in a computer graphics generation system. The method includes the steps of receiving a polygon fragment from a geometry subsystem and determining whether a depth of the incoming polygon fragment is closer than a current depth of a current pixel. An additional step is determining whether a current pixel is completely covered or partially covered by the polygon fragment received. A further step is selecting whether to write the polygon fragment to a pixel resolution buffer or a subpixel resolution buffer based upon whether the current pixel is completely or partially covered by the polygon fragment. The method also includes the step of writing the polygon fragment to the pixel resolution buffer if the pixel is covered by the polygon fragment or a subpixel resolution buffer if the pixel fragment is partially covered by the polygon fragment.

Additional features and advantages of the invention will be apparent from the detailed description which follows, taken in conjunction with the accompanying drawings, which together illustrate, by way of example, features of the invention.

DETAILED DESCRIPTION

Figure 1:
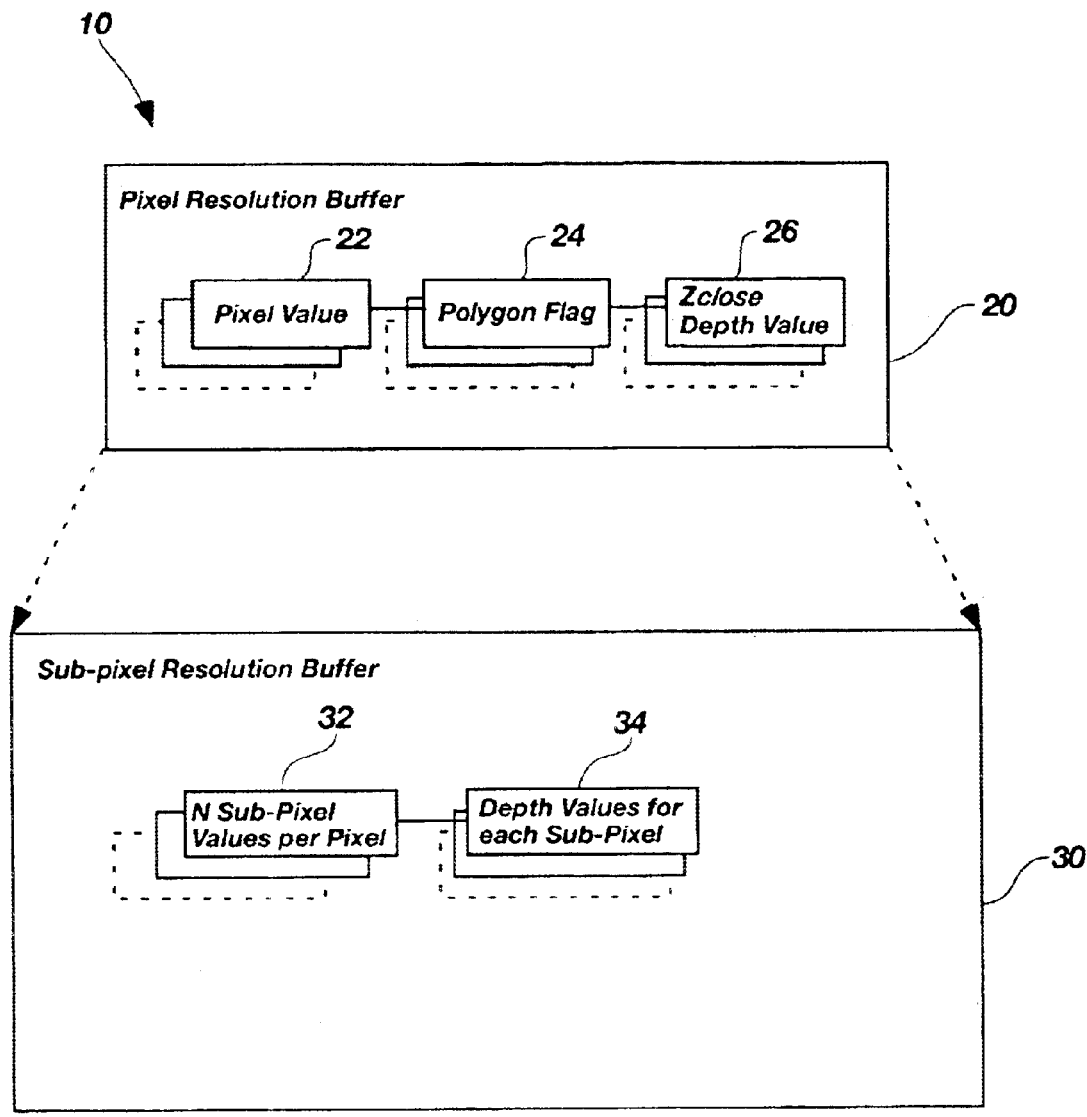
FIG. 1 is a block diagram of the relationship between a pixel resolution buffer and a subpixel resolution buffer in an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention is a system and method for increasing the rendering speed for supersampled computer graphic images. This system and method provides performance approaching systems using a high speed memory device, while retaining the costs associated with lower speed, more cost effective memory.

Figure 4:
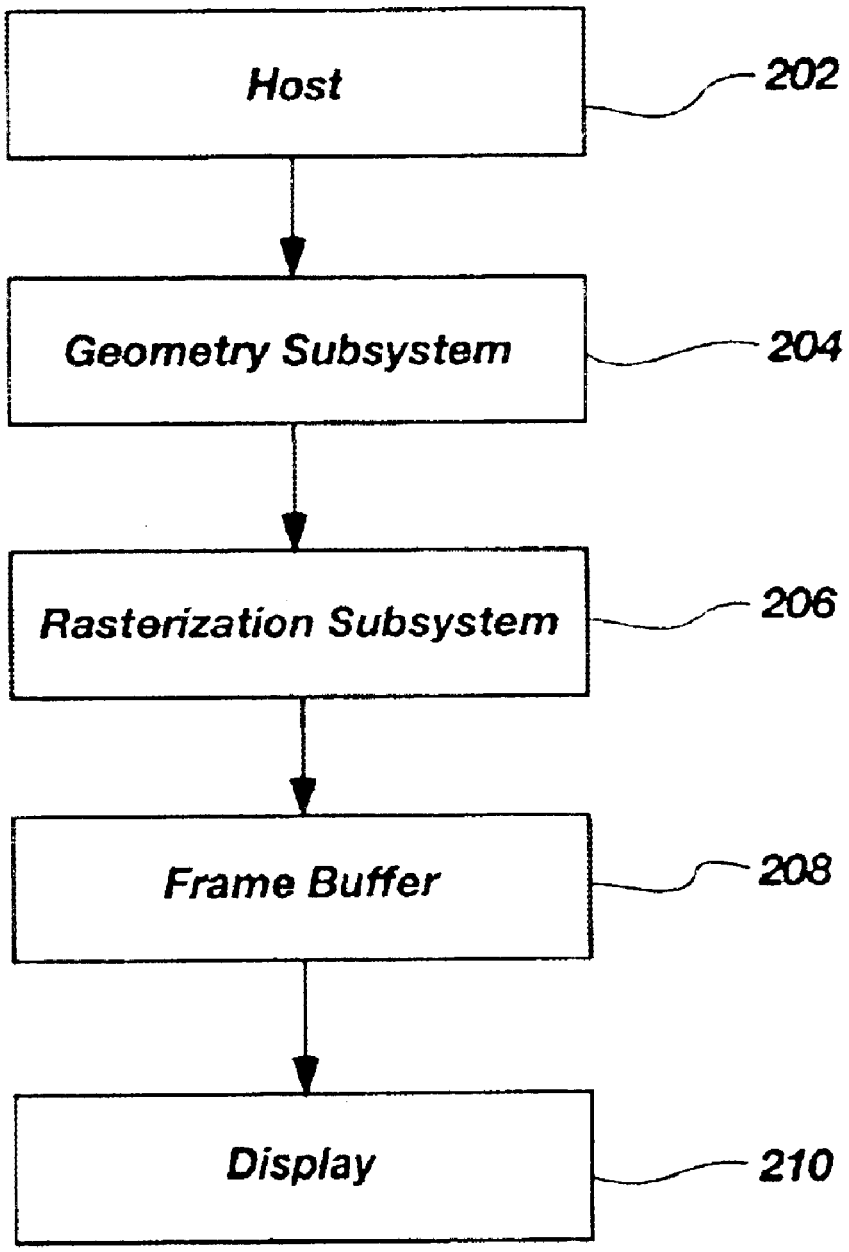
FIG. 4 is a block diagram of elements that are contained in a computer graphics system.

In order to better understand the invention, a computer graphics system within which the present invention can be used will now be discussed. In FIG. 4, a host processor 202 is provided to process a display model or database. The host processor is connected to a geometry subsystem 204, which transforms object coordinate polygon data to the world coordinate system. The geometry system can also take care of lighting, viewing transformation and mapping to screen coordinates. The rasterization subsystem 206 converts transformed primitives to pixels and subpixels. Rasterization includes scan conversion, visible-surface determination and shading. Each pixel and/or subpixel is assigned an X and Y coordinate, a RGBA (i.e., Red, Green, Blue, Alpha) color value and a Z-value. The pixels are stored in a frame buffer 208 and then output to a display 210.

The present invention provides advantages for a rasterization (or rendering) subsystem, because it processes pixels on the interior of polygons or objects at a higher speed that is equivalent to the speed attained when antialiasing is not used on those pixels. This is because the subpixel buffers will not be used for pixels on a polygon's interior. In essence, the antialiasing of pixels using supersampling is avoided when certain recognizable conditions exist. This is in contrast to the prior art that accesses each subpixel to write a depth and color for a subpixel regardless of where the pixel is located.

In the present system, performance degradation generally exists for pixels on the edge of a polygon, for which the subpixel buffers are used. When the majority of pixels in a frame are in the interior of a polygon, then performance improvements may be achieved over prior art antialiasing and supersampling techniques. The performance of the present system and method can approach that of non-antialiased systems as the size of the polygons used by the system increases.

Some prior computer graphics systems have used a sub-pixel region mask, which indicates which subpixels are covered by the same polygon. Then the same depth and color data is written into the group of specific subpixels based on the region mask. Unfortunately, this approach still requires that some or all of the subpixels will be written into for each pixel, even if the pixel is fully covered by one polygon or the incoming polygon fragment is closer than all the stored subpixels. Furthermore, when a pixel is fully covered, this means that the subpixel region mask will write a depth or color into every subpixel that corresponds with the pixel being processed. In order to overcome this problem in the present invention, an incoming polygon fragment that is closer than the stored pixel or subpixels is handled differently.

As illustrated in FIG. 1, a system 10 is shown for optimizing rendering in a supersampling antialiasing system. A pixel resolution buffer 20 is provided to store RGBA values 22 for each pixel. A pixel resolution Z-buffer is included that contains a depth value or Z-value 26. This depth value is the closest Z-value for the pixel, if the pixel is fully covered. The pixel resolution Z-buffer can also contain the closest Z-value of all the subpixels corresponding to the pixel, if the pixel is not fully covered. Prior art systems have not included a pixel resolution buffer Z-value and that increases the bandwidth of information those systems must write into the subpixel buffer when polygons are fully covered.

The pixel resolution buffer contains a polygon flag 24 for each pixel that indicates whether the pixel contains one polygon or multiple polygons. When the depth of the incoming fragment is closer than the stored depth for the current pixel and the pixel is entirely covered by a polygon, then the RGBA information is written to the pixel resolution buffer.

A subpixel resolution buffer is also included 30. Each pixel has multiple subpixels 32 associated with the pixel and there may be 2, 4, 8, 16, or more subpixels allocated to each pixel. Each subpixel stores RGBA values and a Z depth value 34. The subpixels are used for pixels that intersect polygon edges.

In order to display a pixel, the system first attempts to retrieve the RGB value from the pixel resolution buffer. The pixel resolution buffer can contain a valid flag with indicates that the PRB has a valid RGB value or it can contain an "invalid" flag value. The existence of a valid flag allows the screen refresh circuitry to read the sub-pixel buffers only for pixels on the edge of polygons. Reading only pixels with more than one polygon achieves a significant bandwidth savings. If the RGBA value is not valid then the RGB value is calculated from the 2, 4, 8, 16, or more RGB subpixel values stored in the subpixel buffer.

The organization of FIG. 1 allows the system to increase performance by performing antialiasing only on pixels at polygon edges. These edge pixels are generally the ones that benefit most from the antialiasing. In contrast, subpixel processing is avoided for pixels located on the interior of polygons because the pixels are fully covered. This saves the system 2, 4, 8, 16 or even more extra calculations and/or memory operations for each of these pixels depending on the number of subpixels that have been allocated for each pixel. A processing module can be used to determine whether an incoming fragment is closer to the stored pixel depth and value and whether a given pixel is completely or partially covered by an incoming polygon fragment.

Figure 2:
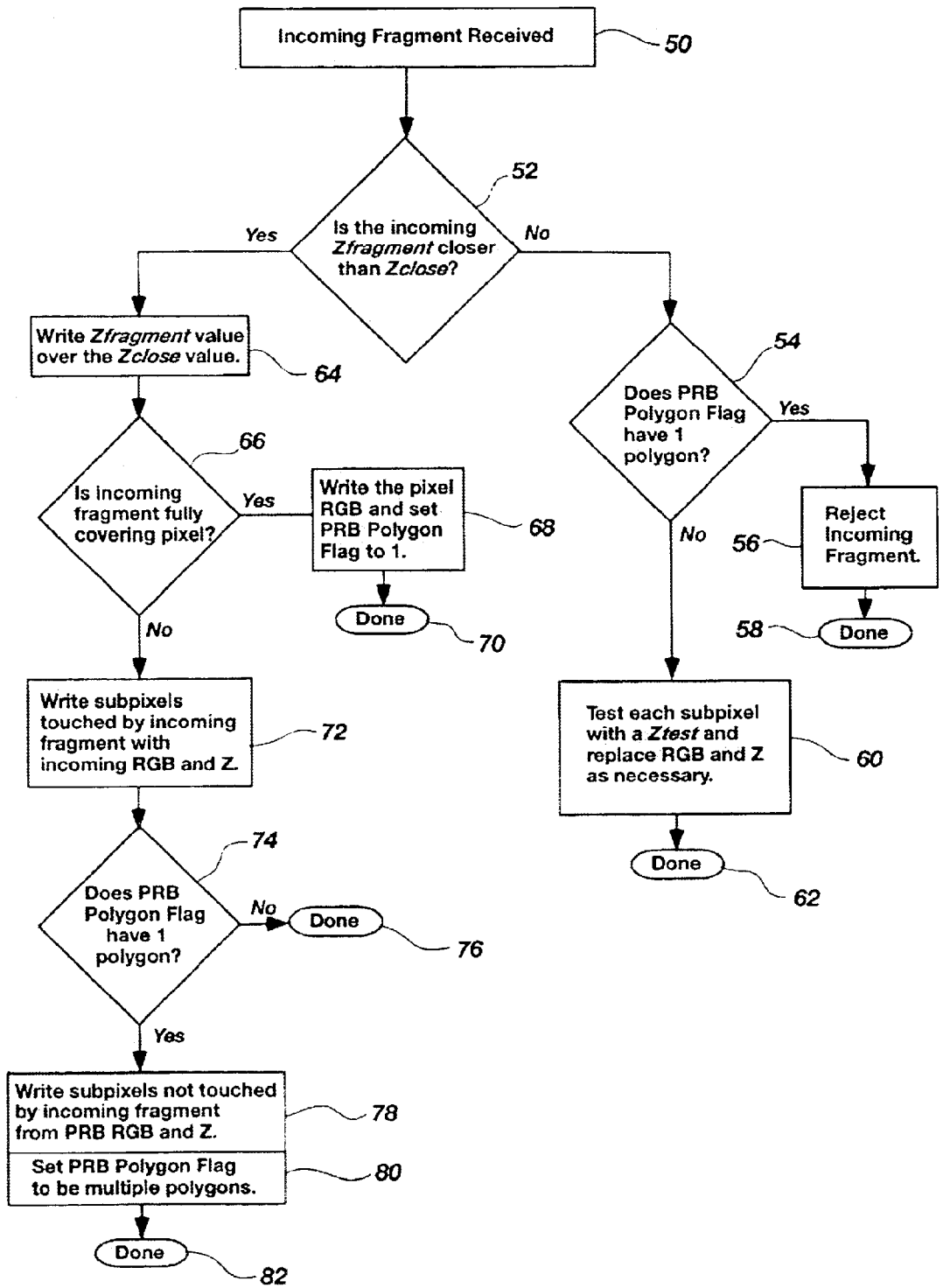
FIG. 2 is a flow chart illustrating steps that can be used with the buffer organization of FIG. 1.

FIG. 2 illustrates the operations that can be performed using the architecture described in FIG. 1. An initial operation will be performed to compare the incoming Z depth to the current pixel resolution buffer Z depth. In addition, the system checks to determine whether the incoming polygon fragment fully covers the pixel, and the destination pixel contains one or multiple polygons.

Before the rendering process begins for a frame, the pixel resolution buffer initializes the pixel resolution Z-buffer to the farthest possible Z value (i.e., highest or lowest depth value). In addition, the polygon flag in the pixel resolution buffer can be initialized to 1. After the initialization has taken place then the rendering process begins. Accordingly, an incoming pixel fragment is received 50. The system first performs a depth test to determine if the $Z_{fragment}$ of the incoming fragment is closer than the stored depth $Z_{close}$ in the pixel resolution buffer 52.

When the incoming fragment is not closer than $Z_{close}$, then the system checks the polygon flag in the pixel resolution buffer (PRB) 54. If the destination pixel contains one polygon and $Z_{fragment}$ is farther then $Z_{close}$ (i.e., $Z_{fragment}>=Z_{close}$ if large Z values correspond to further away, or $Z_{fragment}<=Z_{close}$ if small Z values correspond to further away) then the pixel is rejected 56 and that pixel is done 58. On the other hand, when the polygon flag indicates that the pixel has multiple polygons then each subpixel is tested with a $Z_{test}$ and the RGBA and Z are replaced for subpixels that are farther than the incoming fragment 60. At this point, the pixel is done 62 and the process begins again for the next pixel.

In the alternative case, the depth test 52 determines that the $Z_{fragment}$ of the incoming fragment is closer than the stored depth $Z_{close}$. Next the $Z_{fragment}$ value is written over the $Z_{close}$ value in the PRB 64. The system then checks to see if the incoming pixel fragment fully covers the pixel 66. In the situation where the pixel is fully covered, the system writes the pixel RGBA to the PRB and sets the polygon flag to one 68 to complete the cycle 70.

If the incoming polygon fragment is not fully covered, another path is taken which uses the subpixel resolution buffer. As part of this decision path, the system writes the subpixels that are touched by the incoming fragment with the incoming RGBA and Z 72. The incoming fragment will generally include data from the graphics rendering pipeline. A follow up test checks to see if the PRB polygon flag indicates that the pixel has one polygon 74. If the pixel does not have only one polygon, then the system is done 76 and it moves on to the next pixel.

When the pixel does have only one polygon and the $Z_{fragment}$ is closer than the $Z_{close}$, then the subpixels that are not touched by the incoming fragment are copied from the PRB's RGBA and Z values 78. Then the PRB polygon flag is set to represent multiple polygons 80 and the system has completed the current pixel 82. The polygon flag can use a 0 to represent multiple polygons or some similar flag scheme can be used. The copying of RGB and Z values from the PRB to the subpixel buffer when a second polygon intersects a pixel means the subpixel buffer does not need to be initialized prior to rasterization. This results in a huge savings in bandwidth.

The initial depth test and storage of the depth value in the PRB is a factor in speeding up the operation of this system and method as can be seen in FIG. 2. This is because when the pixel is fully covered by the incoming pixel fragment, the system can store the incoming depth in the PRB. This only requires one memory access as opposed to the prior art, which writes the depth and color of the incoming fragment into each touched subpixel. This is expensive in memory bandwidth and access speed.

An alternative embodiment of the invention allows the depth testing issues to be taken care of in another manner. For example, the polygons in the geometric model can be sorted by depth in advance of rendering as opposed to allowing the sorting to take place at the pixel level using the Z-buffer method. If a list-priority algorithm or some other hidden surface removal is used that avoids depth testing at the pixel level, the present method can be simplified.

Figure 3:
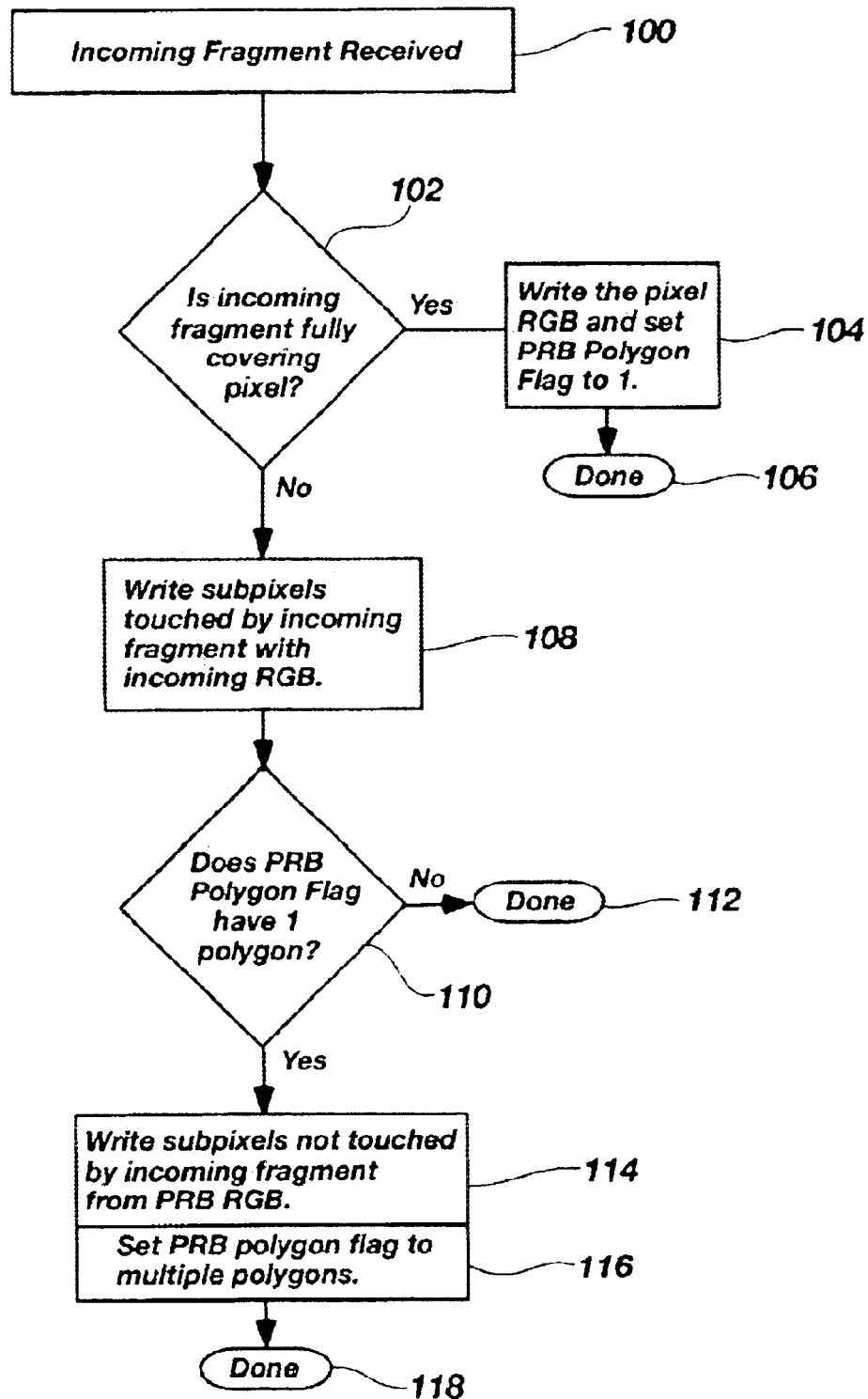
FIG. 3 is a flow chart of steps that can be used with the buffers of FIG. 1 without including depth testing.

FIG. 3 is a flow chart that illustrates a method for optimizing pixel rendering when supersampling is used. This method uses a polygon coverage flag but does not include a depth test. First, the incoming pixel fragment is received 100. The system then checks to see if the incoming pixel fragment fully covers the pixel 102. In the situation where the pixel is fully covered, the system writes the pixel RGB and Z to the pixel resolution buffer and sets the polygon flag to one 104 to complete the cycle 106.

If the incoming polygon fragment is not fully covered, the subpixel resolution buffer will be used. At this point, the system fills the subpixels that are touched by the incoming fragment with the incoming RGB and Z 108. The incoming fragment is graphics data from the graphics rendering pipeline. Another test checks to see if the PRB polygon flag indicates that the pixel has one polygon 110. If the pixel does not have one polygon, then the system is done 112 and it moves on to the next pixel.

When the pixel does have one polygon then the subpixels that are not touched by the incoming fragment are copied from the PRB. The values that are copied from the PRB's into the subpixels are the RGB and Z values 114. Then the PRB polygon flag is set to represent multiple polygons 116 and the system has completed the current pixel 118.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A device for improving pixel rendering performance in a computer graphics generation system, comprising:

a pixel resolution buffer, having a plurality of pixels to store pixel data for incoming polygon fragments and a pixel depth value for each pixel;

a polygon flag for each pixel in the pixel resolution buffer, where the flag indicates that the pixel contains one or multiple polygons;

a subpixel resolution buffer with at least two subpixels corresponding to each pixel in the pixel resolution buffer;

a processing module to determine whether an incoming fragment is closer than the stored pixel depth value and whether a given pixel is completely or partially covered by an incoming polygon fragment; and a selection processor configured to evaluate the polygon flag and copy RGBA data from a graphics pipeline into affected subpixels.

2. A device as in claim 1 further comprising a selection processor configured to evaluate the polygon flag and write the incoming polygon fragment to at least one subpixel in the multi-sampling resolution buffer that corresponds to the pixel, if the polygon flag indicates that the pixel has multiple polygons.

3. A method for improving pixel rendering performance in a computer graphics generation system, comprising the steps of:

receiving a polygon fragment from a geometry subsystem;

determining whether a depth of the incoming polygon fragment is closer than a current depth of a current pixel;

determining whether a current pixel is completely covered or partially covered by the polygon fragment received;

identifying whether the current pixel contains one polygon;

selecting whether to write the polygon fragment to a pixel resolution buffer or a subpixel resolution buffer based on whether the current pixel is completely or partially covered by the polygon fragment;

writing the polygon fragment to the pixel resolution buffer if the pixel is covered by the polygon fragment or a subpixel resolution buffer if the pixel fragment is partially covered by the polygon fragment; and copying RGBA data from the pixel resolution buffer to the subpixel buffers representing subpixels not touched by the polygon fragment received.

4. A method as in claim 3, further comprising the step of writing the incoming polygon fragment's depth over the stored depth value if the incoming polygon fragment's depth is closer than the stored depth value.

5. A method as in claim 3, wherein the subpixel resolution buffer includes two or more sub-samples for each pixel.

6. A method as in claim 3, wherein all the subpixel color values are filled when more than two polygons exist for the pixel.

7. A method as in claim 3, further comprising the step of setting polygon coverage flag to represent multiple polygons.

8. A method for improving pixel rendering performance in a computer graphics generation system, comprising the steps of:

receiving a polygon fragment from a geometry subsystem;

determining whether a depth of the incoming polygon fragment is closer than a current depth of a current pixel;

determining whether a current pixel is completely covered or partially covered by the polygon fragment received;

selecting whether to write the polygon fragment to a pixel resolution buffer or a subpixel resolution buffer based on whether the current pixel is completely or partially covered by the polygon fragment;

writing the polygon fragment to the pixel resolution buffer if the pixel is covered by the polygon fragment or a subpixel resolution buffer if the pixel fragment is partially covered by the polygon fragment; and copying RGBA data from the pixel resolution buffer into the pixels not affected by the incoming polygon fragment.

* * * * *